Aug. 31, 1965  F. S. MACKLEM  3,203,228
MELT INDICATING METHOD AND APPARATUS
Filed Sept. 16, 1963
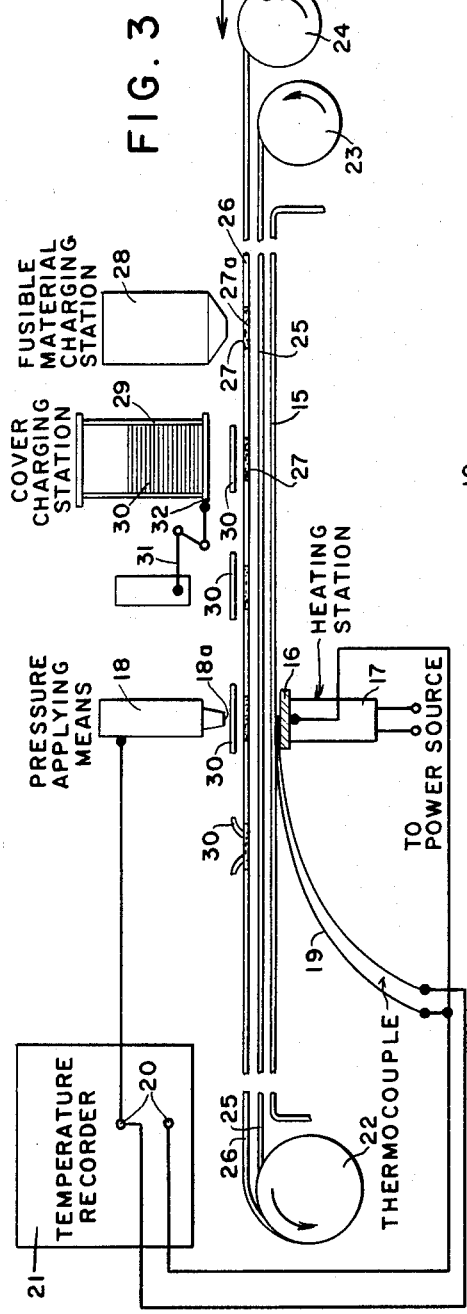
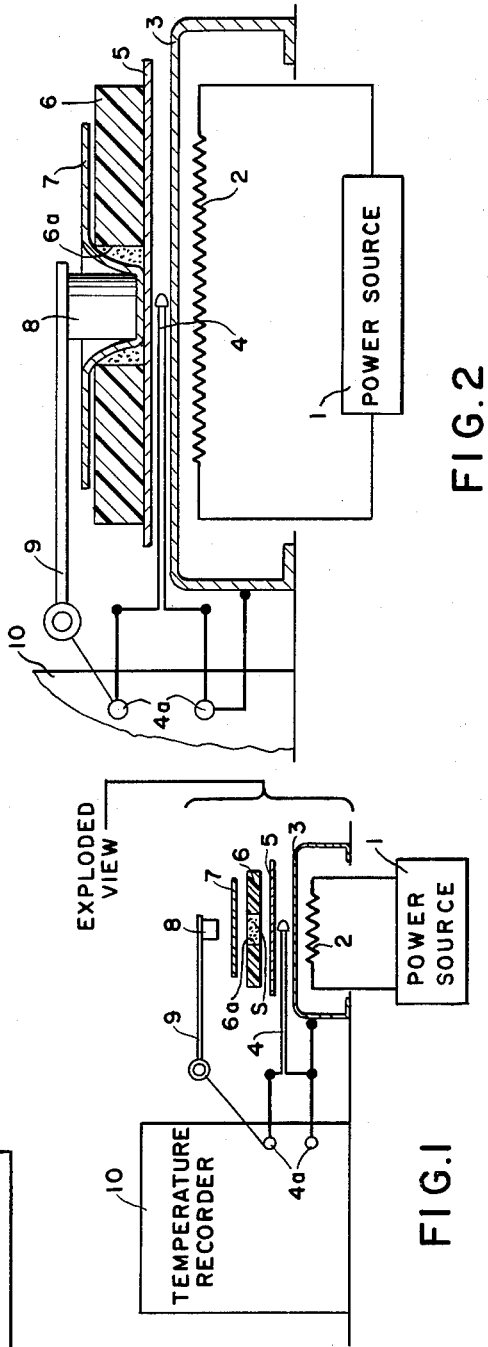
INVENTOR.
F. SUTHERLAND MACKLEM
BY
ATTORNEYS United States Patent Office 3,203,228
Patented Aug. 31, 1965

3,203,228
MELT INDICATING METHOD AND APPARATUS
F. Sutherland Macklem, New Canaan, Conn., assignor to Pyrotel Corporation, Mamaroneck, N.Y., a corporation of New York
Filed Sept. 16, 1963, Ser. No. 309,038
6 Claims. (Cl. 73—17)

This invention relates to a method and apparatus for determining the melting point of fusible materials.

Information concerning the softening and melting points of organic compounds is widely used as a criterion of purity. In the past, this information has been obtained by heating a sample of the compound and visually observing a thermometer as the compound visibly softens and melts. The results obtained by this method depend to a large extent upon operator skill and judgment of what constitutes softening and melting of the material under observation.

In general, the operator must observe the melting process and the temperature more or less simultaneously. Efforts to devise apparatus that would make the measurement of melting temperatures more objective and less dependent upon operator judgment have in the past been directed toward equipment that simultaneously indicates the visible or mechanical state of the material and the temperature.

One approach to the problem has been to indicate the visible state of the sample by means of reflected or transmitted light, impinging on a photoelectric cell, the output of which is metered or amplified and recorded. Simultaneously, the temperature is metered or recorded. Equipment of this type is described by Muller and Zenchelsky in a paper entitled "Instrument for Automatic Determination of Melting Point;" Analytical Chemistry, vol. 24, No. 5, May 1952; pp. 844–847. Similar equipment is described in U. S. Patent 2,669,863, J. J. Shapiro, February 23, 1954.

The mechanical approach to the same problem is described by Norton and Berhenke, "M. P. Determination Goes Automatic;" Chemical and Engineering News, Sept. 19, 1960; p. 77. In this apparatus the sample is melted in a capillary cylinder in which a small piston, containing a thermocouple, presses on it. As the sample melts, the thermocouple output is used to record the temperature while piston travel is taken as the indication of softening and melting.

It would be desirable to provide a method and apparatus which will not only determine objectively the melting point of the fusible material but will reveal the whole melting chemistry, that is to say its softening characteristics as well as its melting point.

It is the object of the invention to provide a method of determining the softening and melting characteristics of fusible materials.

Another object is to provide a method for determining the softening and melting characteristics of fusible organic compounds having softening or melting points ranging up to about 500° C. and, preferably, ranging from about 80° C. to 350° C.

A still further object is to provide an apparatus for determining the softening and melting characteristics of fusible materials.

These and other objects will more clearly appear when taken in conjunction with the following disclosure and the accompanying drawing, wherein:

FIGS. 1 and 2 are illustrative of one embodiment which may be employed in carrying out the invention; and FIG. 3 depicts another embodiment for continuously determining the softening and melting characteristics of fusible materials.

The method of the present invention represents a considerable simplification over early methods in that it derives both the temperature and the physical change of the compound from a single output, namely the output of a temperature measuring element alone.

Stating it broadly, the method aspects of determining the softening and melting characteristics of a fusible material comprise confining a fusible material within an opening passing through a thermally insulative material while sandwiching said confined material between a pair of deformable electrically and thermally conductive sheets, applying pressure to one of said deformable electrically and thermally conductive sheets over the opening in said insulative material, and subjecting said confined fusible material to a heating cycle to melt it while determining the thermal response of said confined material during softening and melting.

The apparatus aspect of my invention comprises, a thermally insulative material having an opening passing therethrough for confining fusible material therein, a first sheet of deformable electrically and thermally conductive material for contacting said insulative material over the opening on one side thereof and a second sheet of deformable electrically and thermally conductive material for contacting said insulative material over the opening on the other side thereof. Included with the combination is a heater having a heating surface adapted to be in heat-transmitting relationship with fusible material confined in the opening of said insulative material through one of said sheets of electrically and thermally conductive material. A pressure applying plunger is provided to be applied to one of said sheets over the opening of said insulative material in contact with the heating surface, including thermal-responsive means thermally associated with said heat surface for determining the thermal response of said fusible material to softening and melting.

The invention is applicable for determining melting points of a wide diversity of materials, including materials having melting points ranging up to about 500° C. and higher and, preferably, organic compounds having melting points ranging from about 80° C. to 350° C. Examples of such materials are: progesterone which has a melting point of 120° C., disosgenin which has a melting point of about 200° C. to 205° C., acetothenetidin which has a melting point of about 134° C. to 136° C., sulfanilamide which has a melting point of about 164.5° C. to 166.5° C., caffeine which has a melting point of about 235° C. to 237° C., and many others.

In the embodiment illustrated in FIG. 1 which is an exploded view, a power control source 1 supplies electrical power to resistance heating element 2 to heat a metallic hot plate 3. In operation, a thermocouple 4 rests on the hot plate and is covered by a thin deformable metal foil 5, for example aluminum or other suitable metal. On this is placed a thin insulative material, such as mica washer 6. The sample to be melted S (e.g. progesterone) is placed in the hole 6a in the mica washer and is covered by a second piece of metal foil 7. A metallic contact 8 is pressed onto the cover foil 7 (note FIG. 2) by a spring loaded metallic arm 9.

The output of the thermocouple is connected to a temperature recorder 10. The metallic hot plate and the contactor 8 are also connected to the temperature recorder 10 as symbolically shown. The sample to be melted is electrically resistive and is in the form of a ground or crystalline powder. Thus, there is little electrical conductance between the upper foil 7 and the lower foil 5, which are insulated from one another by the mica washer and the sample compound.

The metallic foil above and below the material can be disposable so that it is unnecessary to clean the hot plate and contactor after each melt. The thermocouple 4 is sandwiched between the lower foil and the hot plate, where it is in close thermal contact with the lower surface of the sample to be melted. When power is supplied to the hot plate 3, the temperature recorder 10 charts the rising temperature indicated by the thermocouple output. By controlling the power source 1 the temperature rise can be made linear relative to time so that the temperature recording shows a straight line rise.

When the sample S begins to soften it deforms and makes better thermal contact with the lower metal foil. The effect is to increase thermal conductivity through the sample and heat is therefore conducted through the sample away from the thermocouple at an increasing rate. On the temperature chart this appears as a decreasing slope in the recorded temperature rise.

When the melt point is reached, the lower crystals in the sample collapse and cooler unmelted crystals above them drop down to take their place. As a result temperature rise at the thermocouple is temporarily arrested and small fluctuations of the order of a few tenths of a degree C appear and clearly display the mechanical process of collapse in the sample. Thus, the whole softening and melting process is displayed in terms of temperature alone.

Making the hot plate 3 and contacting assembly 8, 9 all metallic allows the hot plate 3 and contactor 8 to be connected across the thermocouple output 4a as shown. This has the advantage that when the melt is complete the thermocouple output is shorted and the recorder returns to zero to signal the end of the melt. The manner in which the shorting is achieved is depicted in FIG. 2 which shows foil 7 deformed by contactor 8 so that contact is made with bottom foil 5 which is shown raised above hot plate 3 for clarity. Actually, foil 5 is in contact with the hot plate. Such a signal can be used in a fully automatic system to initiate a new cycle in taking the melting points of several samples in succession. It is understood that the contact may operate a relay to short the thermocouple, or it may be connected to an amplifier coupled to the output of the thermocouple.

An apparatus embodiment of a continuous system which can be rendered automatic as aforesaid is shown in FIG. 3 which, for purpose of clarity, is an exploded view, it being understood that the foils and the insulative material are actually in intimate contact. The apparatus comprises a supporting surface 15 a portion of which is heated at 16 by heater 17. Directly above the heated portion of supporting surface 15 is disposed a pressure applying contact means 18 adapted by means not shown to apply pressure as in FIG. 2. A thermocouple 19 is provided with its junction at heating surface 16 in close proximity to the bottom foil, the thermocouple being connected across terminals 20 of temperature recorder 21. Both the pressure applying means and the heating surface are also connected across terminals 20 of the recorder. Means for feeding a thin sheet of insulative material and a thin sheet of electrically and thermally conductive material are provided comprising take-up spool 22 and play-off spools 23 and 24. A thin metal foil 25 is drawn off spool 23 along and in contact with supporting surface 15 (foil 25 is separated from the surface so that the elements can be distinguished from each other). Simultaneously, insulative material 26 of mica, Teflon (polytetrafluoroethylene), or other suitable material, having spaced openings 27 passing therethrough for confining fusible material therein is drawn off of spool 24.

The two materials which are in contact with each other are brought to charging station 28 where a measured amount of fusible powdered material 27a, such as progesterone, is metered into opening 27 of insulative material 26. The sheets then move to cover charging station 29 where covers 30 are dropped by means of a linkage system 31 which operates slide 32 to drop cover 30 over fusible material 27a confined in opening 27. The confined material is then brought to the heating station where the material is heated and pressure applied via means 18 through contact 18a acting on foil cover 30. As particles of the fusible material begin to melt, the lower crystals in the sample collapse and cooler unmelted crystals above them drop down to take their place. During this portion of the cycle, foil 30 begins to deform to take up the slack by virtue of the pressure applied by means 18. As a result, as stated above, the temperature rise at the thermocouple is arrested and small fluctuations of the order of about a few tenths of a degree centigrade are recorded by the recorder, thus displaying the melting chemistry prior to total melting of the sample. When the sample has completely melted, the contact 18a pushed foil 30 to the bottom of opening 27 in contact with bottom foil 25. A short occurs from contact 18a through foils 30 and 25 to heating surface 16 and across temperature recorder 21. As has been stated hereinbefore and as will be obvious to those skilled in the art, the short may be employed as a signal means to control the movement of the sheet materials 23, 24 to take-up spool 22, as well as the feeding of fusible material, the feeding of covers 30 and the application of pressure via means 18.

In practicing my invention, I prefer to use aluminum foil as the deformable electrically and thermally conductive material, it being understood that other metals may be employed, such as copper foil, stainless steel foil, and the like. Such foils should preferably have a thickness in the neighborhood of 0.001 inch or smaller. The insulative material will usually have a thickness in the neighborhood of about 0.003 inch.

An advantage of my invention is that the melting characteristics of exceedingly small amounts of fusible material can be accurately determined. The openings in the insulative material, in which the fusible material is confined, may range in diameter from about one-sixteenth to one-eighth of an inch.

It will be seen that I have described a method and apparatus of observing the softening and melting process and the melting point of materials in terms of the output of a temperature sensing element only. I have also shown that the completion of melt can be indicated in terms of the same output. It will be understood that other forms of heating apparatus and temperature sensing elements can be used with this method.

In instances where a signal indicating the completion of melt is of no interest, the use of metallic components is unnecessary. The method of observing the softening and melting process in terms of temperature, as I have described it, is to use the change in thermal conductivity of the sample to indicate the physical and visible changes in the material in terms of the output of a temperature sensing element.

In other cases where it is only required to know the melting point it may be unnecessary to refine the indication to the point where softening and melting is displayed. Then the physical collapse of the material is still derived from the output of the temperature sensing element by using metallic components as described to short the output to zero when melt occurs.

An advantage of the invention is that it enables the determination of the heat flow characteristics of the sample while it is being heated. The flow of heat through the sample arises from the heat sink property of the upper foil and the plunger in contact therewith. Preferably, the plunger, for example plunger 8 in FIGS. 1 or 2, should be designed with sufficient mass to effect a heat sink and assure the desired heat flow through the sample.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

What is claimed is:

1. A method for continuously determining the softening and melting characteristics of fusible material which comprises, feeding a sheet of electrically and thermally conductive material over and in contact with a supporting surface a portion of which is heated, feeding a sheet of insulative material over and in contact with said electrically and thermally conductive sheet, said insulative sheet having spaced openings passing therethrough for confining fusible material therein, charging fusible material into the openings of said insulative material, applying a cover of electrically and thermally conductive sheet material over each of the openings in said insulation material to form an assembly of said sheets, applying pressure to one of said deformable electrically and thermally conductive sheets over the opening in said insulative material while supporting said assembly on said supporting surface, subjecting said confined fusible material to a heating cycle on the heated portion of said supporting surface while continuing the application of pressure to said deformable sheet, determining the thermal response of said confined fusible material during softening and melting, and recording the thermal response characteristics of said fusible material.

2. An apparatus for determining the melting characteristics of fusible material which comprises, a thermally insulative material having an opening passing therethrough for confining fusible material therein, a first sheet of deformable electrically and thermally conductive material in faying relationship with said insulative material over the opening on one side thereof, a second sheet of deformable electrically and thermally conductive material in faying relationship with said insulative material over the opening on the other side thereof, a heater having a heating surface in heat-transmitting relationship with fusible material confined in the opening of said insulative material through one of said sheets of electrically and thermally conductive material, pressure-applying means supported over one of said sheets above the opening of said insulative material, and thermal responsive means thermally associated with said sheets for determining the thermal response of said fusible material during the application of pressure thereon.

3. The apparatus of claim 2 wherein a temperature recording means is coupled to said thermal responsive means.

4. Apparatus for continuously determining the softening and melting characteristics of fusible material which comprises, a supporting surface having a heating portion associated therewith, a pressure-applying means disposed above said heating portion, means for feeding a sheet of electrically and thermally conductive material over and in contact with said supporting surface, means for feeding a sheet of insulative material over and in contact with said electrically and thermally conductive sheet, said insulative sheet having spaced openings passing therethrough for confining fusible material therein, means for charging fusible material into the openings of said insulative material, means for applying a cover of electrically and thermally conductive sheet material over each of the openings in said insulative material, such that the sheet materials assembled at the heating portion of the supporting surface below the pressure-applying means comprise upper and lower layers of electrically and thermally conductive sheets with a sheet of said insulative material sandwiched therebetween, and thermal responsive means associated with said sheets for determining the thermal response of said fusible material during the application of pressure on said assembled sheets.

5. The apparatus of claim 3 wherein a temperature recorder means is coupled to said thermal response means.

6. An apparatus for determining the melting and heat flow characteristics of fusible material which comprises, a thermally insulative material having an opening passing therethrough for confining fusible material therein, a first sheet of deformable electrically and thermally conductive material in faying relationship with said insulative material over the opening on one side thereof, a second sheet of deformable electrically and thermally conductive material in faying relationship with said insulative material over the opening on the other side thereof, a heater having a heating surface adapted to be in heat-transmitting relationship with fusible material confined in the opening of said insulative material through one of said sheets of electrically and thermally conductive material, a pressure-applying heat sink plunger supported over one of said sheets above the opening of said insulative material, and thermal responsive means thermally associated with said sheets for determining the thermal response of said fusible material to heat flowing therethrough during the application of pressure thereon.

References Cited by the Examiner

UNITED STATES PATENTS 3,150,514  9/64  Berhenke _____ 73—17

OTHER REFERENCES

Chemical and Engineering News, Sept. 19, 1960, (page 77).

RICHARD C. QUEISSER, *Primary Examiner*.